Figure 1:
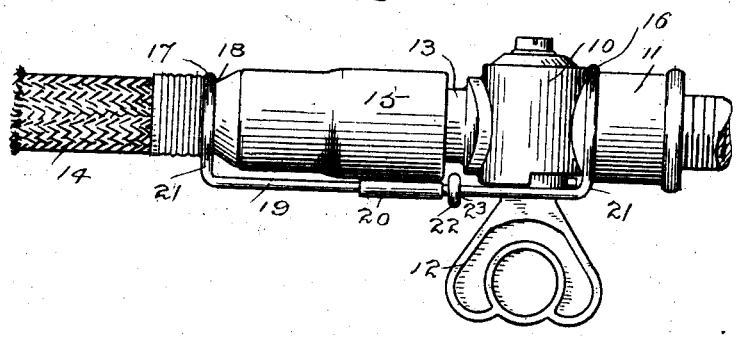

No. 883,220.

PATENTED MAR. 31, 1908.

W. H. MIDDLEBROOK.
CLAMP FOR GAS HOSE.
APPLICATION FILED SEPT. 6, 1907.

Witnesses:
H. A. Lamb.
S. W. Atherton

Inventor
William H. Middlebrook
By Attorney
A. M. Wooster

THE NORRIS PETERS CO., WASHINGTON, D. C.

UNITED STATES PATENT OFFICE.

WILLIAM H. MIDDLEBROOK, OF SOUTHPORT, CONNECTICUT, ASSIGNOR OF ONE-HALF TO JEREMIAH P. OSTERHOUDT, OF KINGSTON, NEW YORK.

CLAMP FOR GAS-HOSE.

No. 883,220.

Specification of Letters Patent.

Patented March 31, 1908.

Application filed September 6, 1907. Serial No. 391,620.

*To all whom it may concern:*

Be it known that I, WILLIAM H. MIDDLEBROOK, a citizen of the United States, residing at Southport, county of Fairfield, State of Connecticut, have invented a new and useful Clamp for Gas-Hose, of which the following is a specification.

This invention has for its object to provide a simple and inexpensive detachable clamp adapted for general use and especially adapted for use in connection with gas hose to prevent the detachment of the hose from the nipple and thus do away with a serious danger in the use of gas heaters, ranges and drop lights.

It is of course well understood that the usual means of connecting up gas heaters, ranges and drop lights is by means of a flexible hose, one end of which is connected to the heater and the other to a nipple upon the gas cock, one or both ends of the hose being ordinarily detachable and the connection being made by means of a flexible socket attached to the end of the hose and passing over a nipple upon the gas cock, or upon the heater or lamp or upon both. It is furthermore well understood that gas heaters frequently require to be moved about and are ordinarily placed out of the way when not in use and that small gas cooking stoves and ranges which are not used continuously are frequently placed upon the top of ordinary cooking stoves when in use and are placed elsewhere when not in use. If the flexible connection is detached when the heater or lamp is not in use, the sockets quickly become stretched and slip on to and off from the nipples easily and even when the sockets are not disconnected frequently the moving of the lamp or heater about tends to disconnect them.

My present invention enables me to provide a clamp adapted to engage both the hose and the gas cock or the lamp or heater cock as may be, and to be locked securely in place thereon, thereby securely locking the flexible hose to the cock so that it cannot be removed in use and the lamp, heater or stove may be moved about without danger of disconnecting the hose, or if the hose be removed when the lamp or heater is disconnected, it may be readily locked to the nipple again so that it cannot become disconnected in use.

Figure 2:
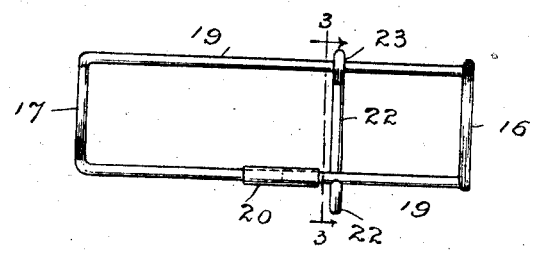
Figure 3:
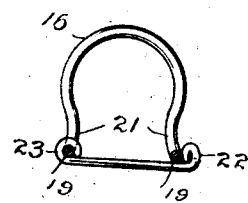

With these and other objects in view I have devised the simple and novel clamp, of which the following description in connection with the accompanying drawing is a specification, reference characters being used to indicate the several parts:

Figure 1 is an elevation illustrating the use of my novel clamp in locking a flexible hose to a nipple; Fig. 2 a plan view of the clamp detached; and Fig. 3 is a section on the line 3—3 in Fig. 2, looking in the direction of the arrows.

10 denotes the body of a gas cock which is provided with a hub 11, a key 12 and a nipple 13.

14 denotes a flexible hose which is provided at its end with a flexible socket 15 adapted to be slipped on over the nipple, as clearly shown in Fig. 1.

My novel clamp is formed from a single piece of wire and consists essentially of a substantially U-shaped clip 16 which is adapted to embrace hub 11, a substantially U-shaped clip 17 adapted to engage the hose at the neck or reduced connection of the flexible socket to the hose, as at 18, said clips lying parallel to each other, and arms 19 connecting the clips, said parts being formed from a single piece of wire, the ends of which preferably abut and are inclosed by a sleeve 20 at the mid-length of one of the arms. In practice the open sides of the clips are preferably curved inward toward each other slightly, as at 21, so as to cause them to close about hub 11 and the neck 18 of the hose with a spring engagement, thereby retaining the clamp securely in place. As an additional means of locking the clamp in place upon hub 11 and upon the hose, I provide a hook 22 having at one end an eye 23 which slides freely upon one arm of the clamp, the shank of the hook extending transversely from arm to arm and the hook proper engaging the arm opposite to the eye, as clearly shown in the drawing.

The operation will be readily understood from the drawing. In use, the flexible socket is slipped over the nipple in the usual way and seated thereon. The hook is disengaged from the arm and allowed to drop down, and then the clamp is placed in position, clip 16 closely engaging hub 11 and clip 17 closely engaging neck 18 of the hose. Clip 17 is shown as made smaller than clip 16 for the reason that the neck of the hose is ordinarily of smaller diameter than hub 11 of the gas cock. As one of the clips engages the neck of the hose and the other clip engages a hub on the gas cock lying on the opposite side of the body from the nipple, it is obvious that the hose cannot possibly slip off from the nipple until the clamp is removed. Having placed the clamp in position, it is locked there by engaging the hook with the opposite arm of the clamp, as clearly shown in the drawing.

Having thus described my invention I claim:

1. A clamp of the character described comprising clips parallel to each other, arms connecting said clips, and a hook connected to one of said arms and adapted to engage the other arm.

2. A clamp of the character described comprising clips parallel to each other, arms connecting the open sides of said clips and a hook having an eye engaging one of said arms and sliding freely thereon, the hook proper being adapted to engage the other arm.

In testimony whereof I affix my signature, in presence of two witnesses.

WILLIAM H. MIDDLEBROOK.

Witnesses:
A. M. WOOSTER,
S. W. ATHERTON.